United States Patent [19]

Clegg

[11] Patent Number: 4,632,092
[45] Date of Patent: Dec. 30, 1986

[54] INSET SOLAR PRISM

[76] Inventor: John E. Clegg, 2320 Keystone Dr., Orlando, Fla. 32806

[21] Appl. No.: 860,962

[22] Filed: May 8, 1986

[51] Int. Cl.$^4$ .............................................. F24J 3/02
[52] U.S. Cl. ............................................... 126/440
[58] Field of Search .............. 126/440, 439; 350/286, 350/259, 258, 261, 106

[56] References Cited

U.S. PATENT DOCUMENTS

| | | | |
|---|---|---|---|
| 2,229,410 | 1/1941 | Gulden | 350/286 X |
| 2,855,819 | 10/1958 | Luboshez | 350/286 |
| 3,860,814 | 1/1975 | Klang et al. | 350/286 X |
| 4,074,704 | 2/1978 | Gellert | 126/440 |
| 4,171,695 | 10/1979 | Sletten | 126/440 X |
| 4,337,759 | 7/1982 | Popovich et al. | 126/440 X |
| 4,567,879 | 2/1986 | Clegg | 126/440 |

Primary Examiner—Larry Jones

[57] ABSTRACT

A hollow transparent glass prism having a planar face which receives a rectangular solar beam perpendicular thereto and having two angular wedge faces which refract the beam to form two concentrated convergent rectangular beams.

1 Claim, 2 Drawing Figures

INSET SOLAR PRISM

BACKGROUND

Prior art includes the Prismatic Solar Beam Concentrator, U.S. Pat. No. 4,567,879, 2/4/86, by this inventor. This concentrator features two prisms having the same shape and outside dimensions as the inset solar prism but having a solid interior. The inset solar prism has structural cavities which reduce the volume and weight of the prism by 75 percent. The inset solar prism is designed to replace the solid prisms of the prismatic solar beam concentrator. The weight reduction is critical, because the prismatic solar beam concentrator will be mounted on the roofs of buildings.

DRAWINGS

DESCRIPTION

Figure 1:
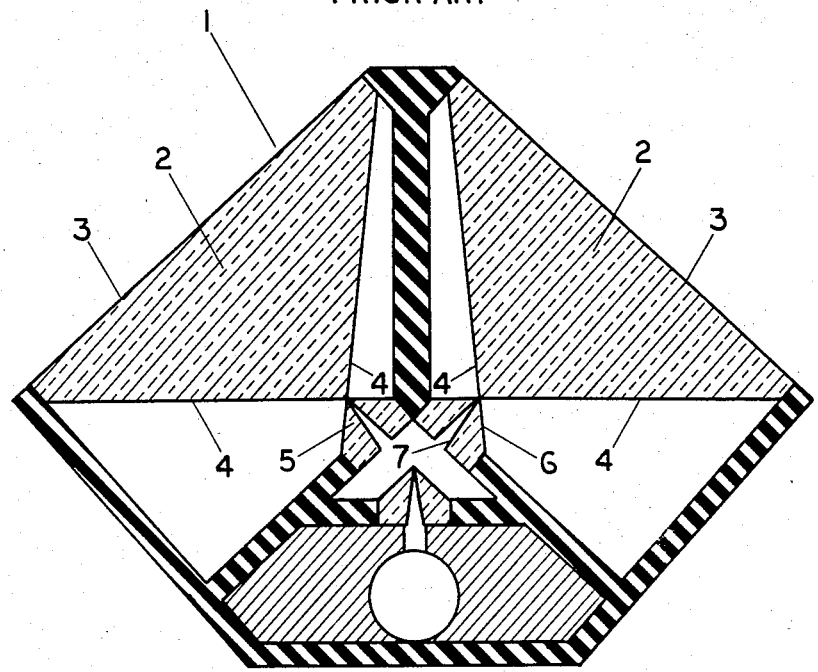
FIG. 1 is an elevation of the prismatic solar beam concentrator with the prisms shown in section.
Figure 2:
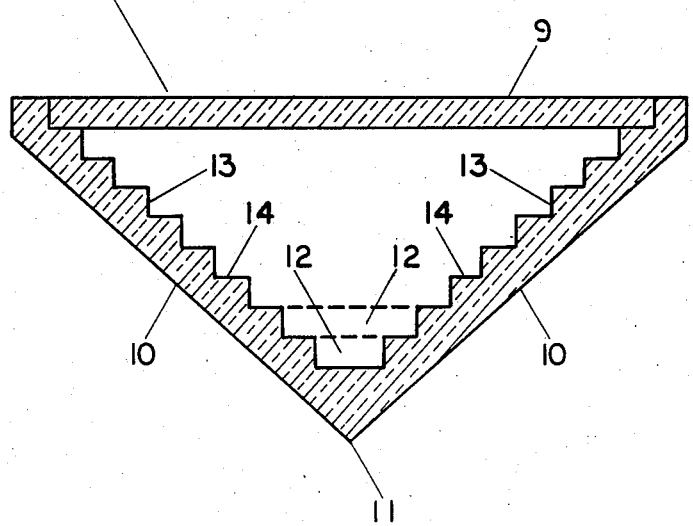
FIG. 2 is an elevation of the inset solar prism, enlarged.

FIG. 1 is an elevation of the prismatic solar beam concentrator 1. The concentrator has two equilateral double prisms 2, each with a planar face 3 and two angular wedge faces 4 of equal dimensions, and three equilateral double prisms 5, each with two angular wedge faces 6 of equal dimensions and two angular V-groove faces 7 of equal dimensions. Equilateral means two equal sides.

The planar faces 3 receive two rectangular beams of diffused sunlight which are perpendicular to the faces and which are transmitted through the prisms to the two angular wedge faces 4. The beams are refracted out of the prisms by the angular wedge faces to form two concentrated convergent rectangular beams which are then refracted twice more by the three double prisms.

Each prism 2 has a cross sectional area of 1900 cm$^2$. The length of the prisms will be determined by the length of the roof on which the beam concentrator is mounted. It is apparent that even a relatively short beam concentrator of twenty or thirty feet will create a weight problem, and it is for this reason that the lighter inset solar prism (475 cm$^2$) has been designed.

The inset solar prism is a hollow transparent glass prism 8 having a planar face 9 and two angular wedge faces 10 opposite the planar face. The two angular wedge faces are planar also.

Planar face 9 has two parallel edges and a centerline parallel to the edges. The elongate dimension of the prism parallel to the centerline is unspecified, though it is contemplated that the unit length of the beam concentrator will be 118 cm or 4 feet.

The two angular wedge faces 10 have inner edges which form the apex 11 of the prism. The outer edges terminate in the vicinity of the edges of the planar face and are parallel thereto.

The apex and the centerline of the prism are intersected by the prismatic plane.

The prism has a series of eight graduated structural cavities 12 defined by two opposed parallel sides 13 adjacent to and equidistant from the angular wedge faces, and defined by two opposed inset faces 14 parallel to the planar face 9 and equidistant from the angular wedge faces.

The opposed sides 13 are opaque so as to intercept radiation not perpendicular to the opposed faces 14.

The opposed sides 13 are equal in depth.

The opposed faces 14 are equal in width.

The upper edge of each opposed side 13 and the inner edge of each opposed face 14 terminate in a common line and in combination form a step opposite the angular wedge faces.

I claim:

1. An inset solar prism comprising in general a hollow transparent glass prism having a planar face which receives a rectangular beam and having two angular wedge faces which refract the beam to form two concentrated convergent rectangular beams, and comprising in particular;

a hollow transparent glass prism (8) having a planar face (9) and two angular wedge faces (10) opposite said planar face, said planar face having two parallel edges and a centerline parallel to said edges, each said angular wedge face having a common inner edge forming an apex (11) opposite said centerline, each said angular wedge face having an outer edge parallel to said edge of said planar face and terminating in the vicinity thereof, said prism having a prismatic plane bisecting said apex and occupying said centerline, said prism having an elongate dimension of unspecified length parallel to said centerline, said prism having a series of eight structural cavities (12) of graduated width defined by two opposed parallel sides (13) adjacent to and equidistant from said angular wedge faces, and defined by two opposed inset faces (14) parallel to said planar face and equidistant from said angular wedge faces, said opposed sides being opaque, said opposed sides being equal in depth, said opposed faces being equal in width, each said opposed side having an upper edge, each said opposed face having an inner edge, each said upper edge and each said inner edge terminating in a common line so as to form in combination a step.

* * * * *